Feb. 27, 1968   A. W. COCHARDT   3,371,044
FERRITE MAGNETS
Filed Jan. 24, 1964

WITNESSES:
Bernard R. Gieguey
James F. Young

INVENTOR
Alexander W. Cochardt
BY H. M. Snyder
ATTORNEY

United States Patent Office 3,371,044
Patented Feb. 27, 1968

3,371,044
FERRITE MAGNETS
Alexander W. Cochardt, Export, Pa., assignor to Westinghouse Electric Corporation, East Pittsburgh, Pa., a corporation of Pennsylvania
Filed Jan. 24, 1964, Ser. No. 339,977
Claims priority, application Germany, Jan. 25, 1963, C 28,989
5 Claims. (Cl. 252—62.54)

This invention is directed to a process for making semi-sintered impregnated permanent magnets and to the magnets made by the process.

This application is based upon my German application C 28,989, filed January 25, 1963. Barium, strontium and lead ferrites are well known ceramic magnet materials which have a hexagonal crystal lattice structure known as the "magnetoplumbite" structure. Certain of these materials are widely available, in both the isotropic and anisotropic types, on a commercial basis and as supplied are in the fully sintered condition and upwards of 90% theoretical density. In this fully sintered condition the ferrite magnets have a high coercive force and remanence and thus are excellent magnets for many purposes. However, the fully sintered magnets are highly brittle in nature and do not lend themselves to machining, and any cutting or alteration of their configuration must be accomplished by diamond cutting tools and grinding wheels. In any case, machining or grinding is an extremely expensive operation and it is very often found that machining and grinding costs form the largest part of the cost of the finished magnet.

An excellent magnetic material of the ferrite type generally described above is disclosed in my U.S. Patent No. 3,113,927, issued December 10, 1963. The material disclosed therein is a modified strontium ferrite displaying excellent magnetic properties, particularly in the oriented condition, which employs relatively impure and inexpensive raw materials, but nevertheless is superior in magnetic properties to strontium ferrite magnets made from high purity materials.

The group of ferrites to which the invention can be applied can be generically described by the formula $MO \cdot n\ Fe_2O_3$, where M stands for one or the other of the elements strontium, barium or lead. The molecular proportion is denoted by $n$, and usually has a value of 6. The magnets may be either of the isotropic or anisotropic type.

It is the object of this invention to provide a composite permanent magnet body having a high coercive force and characterized by good machinability comprising hexagonal crystals with a magnetoplumbite structure of a compound $MO \cdot 6\ Fe_2O_3$, to which M is a metal selected from the group consisting of strontium, barium and lead, in the form of a semi-sintered body which is characterized by a high pore volume and with an impregnant in the pores thereof to provide sufficient strength to assure the strength and integrity of the magnet body.

It is a further object of this invention to provide structurally sound ferrite magnetic bodies having a high coercive force and characterized by excellent machinability.

Other objects of the invention will, in part, be obvious and will, in part, appear hereinafter.

For a better understanding of the nature and the objects of this invention reference should be had to the following detailed description and drawing, in which.

Figure 1:
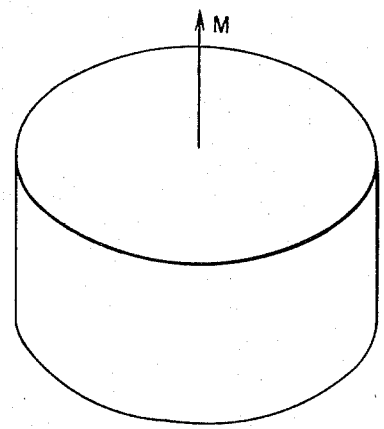
FIGURE 1 is a perspective view of a magnet of this invention.

The invention is particularly directed to composite permanent magnets comprising a semi-sintered body composed of ferrite crystal materials with a magnetoplumbite structure, the semi-sintered body having a pore volume of from 15 to 60% by volume and preferably from 40 to 50% by volume, and the pores thereof being filled with a material capable of binding the ferrite crystals together, the magnet exhibiting an intrinsic coercive force of more than 2500 oersteds. The magnet may be either of the isotropic or anisotropic type.

The process for making the highly machinable magnets is also novel. The process comprises semi-sintering compacted green magnets, produced from a suspension of ferrite particles with or without a magnetic field, at a temperature of from 700° C. to 1150° C. for from 30 minutes to 2 hours; generally the shorter times will apply to the higher temperatures. Such semi-sintering produces a highly porous body which is then impregnated with a suitable material of good machinability to function as a reinforcing binder to strengthen the semi-sintered compact.

Semi-sintering produces great improvement in the coercive force of the ferrite body so treated over that of the crushed ferrite particles employed in producing the product. It is believed that the improvement in coercive force is due to the release of the imperfections of the crystal lattice at the semi-sintering temperature. These imperfections, probably much as in the case of metals, apparently are due to the cold working, the crushing, pulverizing and pressing applied to the ferrite crystals. I have found that in the case of most ferrite materials the temperature required for the elimination of imperfections by a diffusion process lies between about $0.7\ T_K$ to $0.9\ T_K$, where $T_K$ is the absolute melting temperature of the finely divided crystals in degrees Kelvin. In the case of modified strontium ferrites, a preferred material, this temperature lies essentially between 800° C. and 1100° C. for treatment periods of approximately one hour.

As pointed out above, the temperature at which the semi-sintering step is carried out is substantially below the sintering temperature. Therefore a large part of the original pore volume remains after the treatment. The semi-sintering treatment of anisotropic ferrite bodies results in less than 1% shrinkage perpendicular to the direction of magnetic orientation of the particles in the green compact whereas a fully sintered anisotropic ferrite body sustains about 10% shrinkage perpendicular to the direction of magnetic orientation. Further, the pore volume of a fully sintered ferrite body amounts to only 10% or less, while semi-sintered ferrite bodies may have pore volume of as much as 50% and higher.

At the semi-sintering temperature the ferrite crystals do not combine into the hard, brittle body which is observed after full sintering. As a matter of fact, the semi-sintering improves the structural strength of the compacted body only to a relatively small extent. Thus, the semi-sintered ferrite body needs to be handled with care to prevent crumbling or breaking. When, therefore, an appropriate impregnant is introduced into the pores, the strength and machinability of the finished magnet will largely depend upon the character of the impregnant.

In producing the green compact in accordance with this invention, while the particles of calcined or presintered material may be compacted in a dry condition, it has been found preferable to employ wet compaction from a slurry particularly if the compaction is to be performed in a magnetic field to obtain an oriented magnetic body. In such a process the slurry is formed to the desired shape concurrent with the removal of water by pressing, slip casting, mechanical agitation, rolling or extruding. For compaction in the magnetic field, the particles should have an average particle diameter of from about 1 to 20 microns. The magnetic field intensity employed should be at least 500 oersteds during the compaction.

In the wet compaction process, the presintered powder mass is mixed with a fluid which is principally water, but which may include 1 or 2% of a dispersing agent, such as sodium naphthalene sulfate or polyvinyl-pyrrolidone. The slurry thus formed is enclosed in a die having a movable wall, at least one wall of which die is a filter plate supporting a filter. As the movable wall exerts pressure on the slurry the water is forced through the filter and filter plate, while at the same time the filter prevents escape of the powder particles. Thus, after compacting, there remains in the die a formed ferrite mass having a small amount of moisture associated therewith. It will be appreciated that if the slurry is compacted in a magnetic field the ferrite particles will more readily orient themselves since their freedom of movement is enhanced by the presence of the fluid medium. The wet-pressed magnets are subsequently dried in air, preferably in a drying oven, at temperatures of from 50° C. to 250° C.

For wet compaction in a filter press, a pressure for pressing the powders of between 1,000 p.s.i. and 5,000 p.s.i. has been found to be satisfactory. However, greater pressures up to 25 tons per square inch, and lower pressures, may be employed.

When the powders have been compacted in a magnetic field it has been found to be desirable to demagnetize the compacted magnets for subsequent processing thereafter. This demagnetization does not affect the ultimate magnetic properties of the magnets. It merely facilitates handling in further treatment since the demagnetized pressed magnets will not adhere to each other or to other ferromagnetc materials.

As pointed out previously a preferred ferrite material from which the magnets of this invention may be made are the modified strontium ferrites fully described in U.S. Patent No. 3,113,927. A brief description of this modified strontium ferrite material and the manner in which it is obtained will, however, be given. Complex alkaline earth carbonates are employed in the manufacture of the impure strontium ferrite magnets. By complex alkaline earth carbonates it is intended to include materials which in addition to the principal alkaline earth component have other carbonates and other substances present in minor quantities. Particularly advantageous has been the use of the mineral celestite as an initial raw material. The mineral celestite consists primarily of strontium sulphate. However, it also contains barium sulphate, silicon oxide, aluminum oxide and other constitutents. The total sulphates and other constituents in such mineral deposits vary by a few percent depending upon the origin. One celestite which has been used had the following approximate composition, expressed in weight percent:

| | wt. percent |
|---|---|
| $SrSO_4$ | 94.18 |
| $CaSO_4$ | 1.82 |
| $BaSO_4$ | 2.82 |
| $CaCO_3$ | 0.43 |
| $SiO_2$ | 0.50 |
| $Al_2O_3$ | 0.25 |

Employing this celestite, a sulphate-containing complex strontium carbonate is prepared by reducing the sulphate with carbon or by means of a reducing atmosphere to a sulphide. The sulphide is thereafter dissolved in water, and then the carbonate sulphate mixture is precipitated by means of a water soluble carbonate or by introducing carbon dioxide gas. In this way, a complex strontium carbonate is obtained which contains substantial amounts of the sulphate and whose strontium carbonate content lies in the region of 89–93% by weight. Approximately 5% of the complex strontium carbonate consists of $CaCO_3$, $SrSO_4$, $BaSO_4$, $SiO_2$, and $Al_2O_3$. A mixture of the complex strontium carbonate and iron oxide will produce good magnets when sintered. Additions, such as fluxing agents, may also be made if desired. The sintered magnet material made from complex strontium carbonate and iron oxide will have a composition, by weight, of from 7% to 18% SrO, from 0.1% to 2% $SrSO_4$, up to 1% BaO, up to 1% CaO, and the balance $Fe_2O_3$. It may also include up to 1% of a compound selected from the group consisting of $CaSO_4$, $BaSO_4$, and $Na_2O$, up to 5% of at least one of the compounds selected from the group consisting of $SiO_2$ and $Al_2O_3$.

There follow a number of examples of the practice of this invention in making impregnated semisintered ferrite magnets.

EXAMPLE I 85.3% by weight of pure red iron oxide $Fe_2O_3$, 14.2% by weight of a complex strontium carbonate and 0.5% by weight of calcium fluoride $CaF_2$, were mixed and wet-ground in a ball mill for 4 hours. As complex strontium carbonate is used, the material contains about 5% by weight $CaCO_3$, $SrSO_4$, $BaSO_4$, $SiO_2$, $Al_2O_3$ in addition to the strontium carbonate which is the main component.

The mixed slip is dried continuously in a drying oven by evaporation of water. The dried cake is reacted or calcined at 110° C. for 1 hr. The calcined clinker is ground in a ball mill for 45 hours in a 3% soution of sodium napthalene sulphate. The ground slip is pressed in a filter-press in a magnetic field of approx. 3,000 oe. and at the final pressure of 300 kg./cm.$^2$.

The green compact of this kind has the following properties: $_IH_c=1180$ oe., $V_p=45\%$ by volume; $V_p$ means the pore volume (volume of the voids). These and all similar values given hereafter are at room temperature.

After drying, the green compacts are subjected to semisintering. They are heated in an ordinary ceramic kiln in an oxidizing atmosphere, for example air, at the rate of heating of from 30 to 200 degrees centigrade per hour to a semi-sintering temperature of 1000° C. and held for 30 minutes. During this time the density of imperfections in the permanent magnetic crystals is considerably reduced and the coercive force is markedly increased.

The semi-sintered magnet cores are impregnated at 25° C. by immersion in a bath of the following impregnating material which consists of 4 parts by weight of a low-viscosity epoxy resin (Epon 815) and 1 part by weight of a low viscosity epoxy catalyst (Epon curing agent U). The semi-sintered magnet cores are vacuum treated before being immersed and are then left in the bath for 30 minutes. The excess impregnant is subsequently removed by shaking. The impregnant magnet core is heated to 120° C. to cure the resin. It is then magnetized.

A composite magnet produced in this manner has the following properties: $_IH_c=3950$ oe., $V_p=40\%$ by volume, $B_r=2460$ gauss, $(BH)_{max.}=1.27$ m.-g.-oe., (mega-gauss-oersteds).

A permanent magnet of this type can be easily machined with the usual tool steels. It can be cut, preferably in the demagnetized state, with ordinary cutting saws. Holes can also be drilled in the magnet body with relative ease. In a similar manner the semi-sintered ferrite can be impregnated with molten lead, and equally good properties are obtained.

Figure 2:
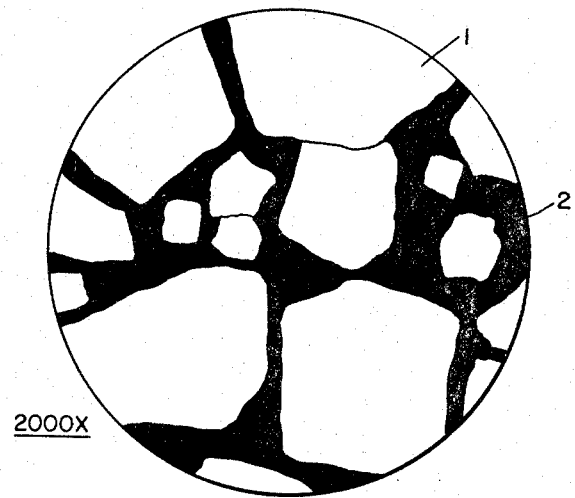
FIGURE 2 is a view of the microstructure of a magnet of this invention.

In FIGURE 1a a disc-shaped magnet of this invention is shown with the direction of magnetization indicated by the arrow M. The microstructure of the magnet of this invention is shown at a magnification of 2000× in FIGURE 2. It will be noted that the ferrite particles 1 have not coalesced and the binder 2 fills the interstices of the structure.

EXAMPLE II

Permanent magnets were made following the procedure given in Example I, with the following difference in the impregnating treatment. Molten naphthalene wax was employed as the impregnating material. The bath was kept at 140° C. and the impregnation was carried out in air. A permanent magnet of this type has the same magnetic properties as the permanent magnet in Example I. It has a lower compression strength but on the other hand it can be machined in many respects even more easily than the permanent magnet in Example I.

EXAMPLE III

Permanent magnets were made as in Example I, with the following difference in the impregnating treatment of the semi-sintered body. The impregnating material used was a mixture of 3 parts by weight of an epoxy resin with high viscosity at room temperature (Epon 828) and 2 parts by weight of an organic amine anhydride epoxy catalyst with high viscosity at room temperature (Versamid 125), which were separately heated to 150° C. They then were mixed in a bath whereby the temperature of the bath increased to approximately 160° C. due to exothermic reaction between the resin and the catalyst. The resin mixture has a low viscosity for approximately 10 minutes in air and impregnation of the magnet body had to be effected in this period of time.

A permanent magnet produced by the impregnation in this manner has the same magnetic properties as the permanent magnets in Examples I and II. It can be relatively easily machined. Due to the higher content of the catalyst and to the thermal hardening it is softer than the permanent magnet of Example I.

These three examples show, that the impregnating material has no effect on the magnetic properties of the semi-sintered ferrite body. The semi-sintered ferrite body does not react with organic substance below approximately 600° C. Also at higher temperatures the semi-sintered ferrite is essentially inert against chemical reactions with the organic substances employed. During impregnation, the ferrite body does not change in composition. Further, the microstructure thereof does not change. Therefore, the semi-sintered, unimpregnated magnets and the semi-sintered impregnated magnets have generally the same magnetic properties within the normal deviation of the measured values.

Examples IV, V and VI illustrate the effect of progressively higher semi-sintering temperatures applied to a ferrite produced at a low calcining temperature.

EXAMPLE IV

The same process as in Example I was used with the difference that the initial calcining or reaction was carried out at 1150° C. for one hour. A green compact, made employing the ferrite produced at such a low calcining temperature, had the following properties:

$_IH_c = 1710$ oe., $V_p = 60\%$ by volume

The green compact was semi-sintered at 950° C. for one hour, a somewhat lower temperature than in Example I, and then impregnated in the epoxy resin. The impregnated permanent magnet had the following properties:

$_IH_c = 4050$ oe., $V_p = 55\%$ by volume
$B_r = 1770$ g., $(BH)_{max.} = 0.65$ m.-g.-oe.

Due to higher content of the resin and due to the lower proportion of permanent magnet crystals, impregnated permanent magnets of this type can be machined still more easily than the permanent magnets in Examples I, II and III.

EXAMPLE V

The process used in Example IV is followed with the exception that the semi-sintering was carried out at 1050° C. for one hour. The impregnated permanent magnet had the following properties:

$_IH_c = 4800$ oe., $V_p = 35\%$ by volume
$B_r = 2410$ gauss, $(BH)_{max.} = 1.20$ m.-g.-oe.

Permanent magnets of this kind have a good combination of coercive force and energy product $(BH)_{max.}$. They can be machined almost as well as the permanent magnets in Example I.

EXAMPLE VI

The process outlined in Example IV was used with the exception that the semi-sintering was carried out at 1150° C. The impregnated permanent magnet had the following properties:

$_IH_c = 3350$ oe., $V_p = 18\%$ by volume
$B_r = 3590$ gauss, $(BH)_{max.} = 3.05$ m.-g.-oe.

The permanent magnets made employing the relatively high semi-sintering temperature of this example had, when compared with the magnets of the other examples, a substantially lower coercive force, a higher energy product, increased strength and relatively poorer machinability.

EXAMPLE VII

The process as in Example VI was used with the difference that 1 hour before the end of the ball milling there was added to the ground slip 5% by weight (based on the dry weight of the clinker) of fine powdered aluminum oxide ($Al_2O_3$) and that it was then ball milled for a total of 90 hours. A green compact from this ball milled product had the following properties:

$_IH_c = 1620$ oe., $V_p = 70\%$ by volume

The semi-sintering also differed from Example VI in that this step was carried out at 1100° C. The impregnated permanent magnet had the following properties:

$_IH_c = 6880$ oe., $V_p = 65\%$ by volume
$B_r = 1250$ gauss, $(BH)_{max.} = 0.35$ m.-g.-oe.

This permanent magnet had a content of epoxy resin of approximately 65%. It was very easily machined.

EXAMPLE VIII

The procedure described in Example I was used with the difference that the slip comprised three different kinds of calcined product and the three kinds of slip were mixed shortly before the pressing. There were used: 60% by weight of the slip as in Example I, 30% by weight of the slip as in Example IV, and 10% by weight of the slip as in Example VII. Also, contrary to all other examples, a high pressure of 2,000 kg./cm.$^2$ was used for pressing. The green compact had the following properties:

$_IH_c = 1310$ oe., $V_p = 35\%$ by volume

The density of the pressed piece is unusually high due to the fact that the various slips had particles of various sizes which provided good packing. The semi-sintered and impregnated permanent magnet has the following properties:

$_IH_c = 3920$ oe., $V_p = 30\%$ by volume
$B_r = 2610$ gauss, $(BH)_{max.} = 1.43$ m.-g.-oe.

These permanent magnets are distinguished by especially high energy product with a relatively good machinability. This results from the fact that the ferrite crystals of the green compact permanent magnet essentially do not grow during the semi-sintering.

EXAMPLE IX

The procedure given in Example I is followed with the difference that the raw materials used were 81.5% by weight of iron oxide $Fe_2O_3$, 17.5% by weight of barium carbonate $BaCO_3$ and 1.0% by weight of lead oxide PbO. The green compact has the following properties:

$_IH_c = 1220$ oe., $V_p = 45\%$ by volume

After semi-sintering, the impregnated permanent magnet had the following properties:

$_IH_c = 3210$ oe., $V_p = 40\%$ by volume
$B_r = 2390$ gauss, $(BH)_{max.} = 1.19$ m.-g.-oe.

Almost the same properties as in case of modified strontium ferrites can be obtained also in case of barium ferrite with addition of lead oxide, but with lower coercive force. Lead ferrites are also suitable materials. The machinability of the impregnated barium and lead ferrites is similar to that of the permanent magnets of Example I.

In addition to the epoxy resins and napthalene wax employed as impregnating materials, many other organic and metallic materials may be used as impregnants, such as polyester, acrylic and phenolic resins, asphalts and waxes, rubbers, low melting point metals such as lead, tin, bismuth, solders of all kinds with a melting point up to 1000° C., and inorganic salts which are solid at temperatures of 200° C. and higher. The impregnants should be relatively cheap and they must be in liquid form during impregnation. Generally these binders will be non-magnetic.

The impregnation can be provided by many known methods. Instead of immersion in a bath, a method widely used in powder metallurgy can also be applied here. In this method the semi-sintered magnetic core and a solid impregnating material are heated simultaneously in an oven. The solid impregnating material is placed in contact with the semi-sintered body and then the temperature of the body is raised to a level at which the impregnating material becomes fluid and then the impregnant flows by capillary action and fills the pores of the semi-sintered body. The temperature of impregnation is invariably below the semi-sintering temperature.

The impregnation although it has been described as taking place in air or in vacuum may also be carried out under special atmospheres.

There have thus been described impregnated semi-sintered ferrite magnets. Such magnets have relatively high magnetic properties and greatly improved machinability.

I claim as my invention:

1. A ceramic permanent magnet comprising a semi-sintered ferrite body of high porosity and exhibiting an intrinsic coercive force of more than 2500 oersteds, the pores of said ferrite body being filled with a material capable of conferring substantial structural strength to the ferrite body and also being characterized by good machinability whereby the magnet as a whole possesses relatively good strength and machinability.

2. The magnet of claim 1 in which the ferrite body is anisotropic.

3. A composite ceramic permanent magnet composed of a porous semi-sintered oriented ferrite body in which the pores constitute from 15% to 60% by volume thereof, the pores of said ferrite body being filled with an essentially non-magnetic binder material which is capable of attaining the fluid state at temperatures substantially below the semi-sintering temperature of said ferrite body, said binder material having substantial structural strength when in the solid state and being further characterized by good machinability, whereby the composite ceramic permanent magnet body exhibits an intrinsic coercive force of more than 2500 oersteds, is structurally sound, and possesses relatively good machinability.

4. The composite ceramic permanent magnet of claim 3 in which the binder is an organic material.

5. The composite ceramic permanent magnet of claim 3 in which the porous semi-sintered ferrite body is composed of a modified strontium ferrite and the binder is composed of an epoxy resin.

References Cited

UNITED STATES PATENTS

| Re. 26,153 | 1/1967 | Cochardt | 252—62.5 |
| 2,964,793 | 12/1960 | Blume | 264 |
| 3,115,461 | 12/1963 | Danis et al. | 252—62.5 |
| 3,246,060 | 4/1966 | Blume | 264—67 |

FOREIGN PATENTS 883,047 11/1961 Great Britain.

ROBERT F. WHITE, *Primary Examiner.*

J. A. FINLAYSON, *Assistant Examiner.*